F. VAN KOOY.
VENTILATING GRATING.
APPLICATION FILED NOV. 7, 1919.
1,333,759.
Patented Mar. 16, 1920.
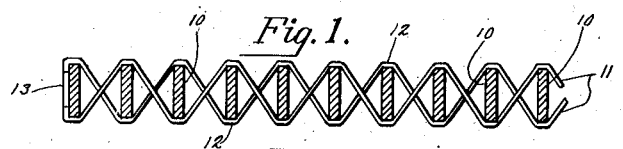
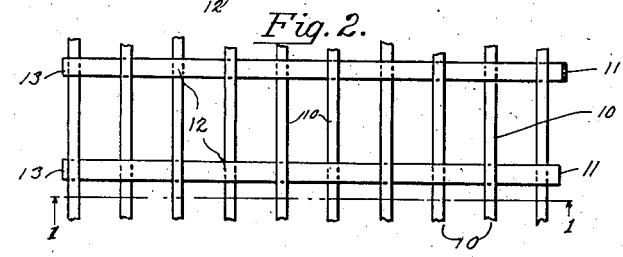
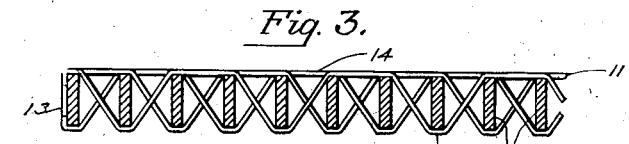
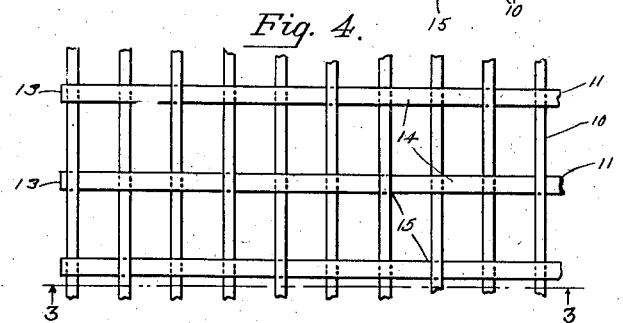
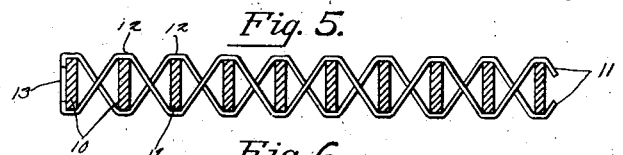
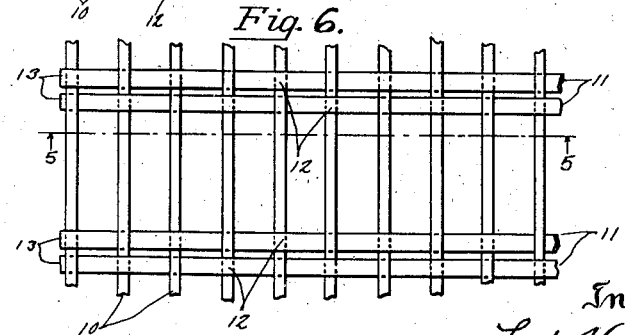
Inventor
Fred Van Kooy,
By Morsell & Keeney,
Attorneys.

UNITED STATES PATENT OFFICE.

FRED VAN KOOY, OF MILWAUKEE, WISCONSIN.

VENTILATING-GRATING.

1,333,759.   Specification of Letters Patent.   Patented Mar. 16, 1920.

Application filed November 7, 1919. Serial No. 336,408.

*To all whom it may concern:*

Be it known that I, FRED VAN KOOY, a citizen of the United States, and resident of Milwaukee, in the county of Milwaukee and State of Wisconsin, have invented new and useful Improvements in Ventilating-Gratings, of which the following is a description, reference being had to the accompanying drawings, which are a part of this specification.

The present invention relates to certain new and useful improvements in ventilating gratings or the like, and has for one of its objects to provide a grating in which the parallel spaced apart bars thereof will be rigidly held against movement, which will have the loads placed thereon evenly distributed and which will have a large ventilating area, and which will permit the "trucking" thereon in any direction.

Another object of the present invention is to provide a grating of the class described in which the supporting bars will not have holes punched therein in order to secure them in spaced relation.

A further object is to provide a grating of the class described which will be simple of construction and which will be practical for the purposes described.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a sectional view taken transversely through a portion of a grating embodying my invention, said view being taken on the line 1—1 of Fig. 2.

Fig. 2 is a top plan view of a portion of my grating.

Fig. 3 is a view similar to Fig. 1, said view being taken on the line 3—3 of Fig. 4, and depicting a slightly modified form of my invention.

Fig. 4 is a top plan view of a portion of that form of grating depicted in Fig. 3.

Fig. 5 is a view similar to Fig. 3, said view being taken on the line 5—5 of Fig. 6, and illustrating a still further modified form of grating, and Fig. 6 is a top plan view of a portion of that form of grating depicted in Fig. 5.

Referring now more particularly to the accompanying drawing and more especially to Figs. 1 and 2, 10 designates a plurality of parallel supporting bars adapted to be arranged in spaced relation by means of transverse metal strips 11. The strips 11 are provided with staggered bends 12 adapted to engage the top and bottom faces of opposite bars 10 to thus retain the bars 10 in their spaced relation and securely reinforce the same.

The ends of the strips 11 are folded or bent to lie against the side of the outermost bars 10 as at 13, and may be spot welded thereto if desired, although the tension of the strip when bent thereagainst is sufficient to retain the same in position. This structure firmly retains the strips in position as one strip has one bend 12 engaging the top face of one bar 10 and the next adjacent strip 11 has its adjacent bend 12 engaging the lower face of said bar 10.

In Figs. 3 and 4 I have illustrated the strips 11 as having their bends 14 engaging the top faces of the bars 10 as passing over two bars 10 at a time and then their lower bends 15 engaging the lower face of but one bar 10. In this form of my invention the strips 11 are used in groups of three whereby the lower face of each bar 10 will be nested within one bend 15 of the strips 11. The ends of the strips 11 are secured, as at 13, to the outermost bars 10, as before described.

Referring now more particularly to Figs. 5 and 6, the strips 11 are engaged with the bars 10 in the same manner as described with reference to Figs. 1 and 2, but are employed in pairs in which the strips of each bar are disposed side by side.

From the foregoing description taken in connection with the accompanying drawing, it will be at once apparent to those skilled in the art to which an invention of this character appertains that by reason of the fact that no holes whatsoever are punched in the bars 10 to thus weaken them, that a grating structure according to my invention may be made to cover almost any span, will have an increased ventilating area, will be "anti-rattling", will have an equal distribution of loads and will permit the "trucking" therefrom in any direction.

What I claim as my invention is:

1. A ventilating grating comprising a plurality of spaced apart substantially parallel bars, and a transverse bar bent to engage with opposite faces of the parallel bars to maintain the same in spaced relation.

2. A grating of the class described comprising a plurality of spaced apart parallel bars, and means alternately engaging the upper and lower faces of the bars to maintain the same in spaced relation.

3. A grating of the class described comprising a plurality of spaced apart substantially parallel bars, and transverse bars binding the parallel bars in spaced relation to form a unitary grating, said transverse bars having offset portions on different parallel planes for engaging the upper and lower faces of the parallel bars.

4. A grating of the class described comprising a plurality of spaced apart substantially parallel bars, and transverse bars binding the parallel bars in spaced relation to form a unitary grating, said transverse bars having offset portions on different parallel planes for engaging the upper and lower faces of the parallel bars, one transverse bar engaging the faces of the parallel bars opposite to those engaged by another transverse bar.

In testimony whereof, I affix my signature.

FRED van KOOY.